United States Patent [19]
Roberts

[11] 4,213,745
[45] Jul. 22, 1980

[54] PUMP FOR CENTRAL HEATING SYSTEM

[76] Inventor: Samuel A. Roberts, Courtways, Holwood Park Ave., Keston Park, Farnborough, Kent, England

[21] Appl. No.: 941,058

[22] Filed: Sep. 11, 1978

Related U.S. Application Data

[63] Continuation of Ser. No. 681,451, Apr. 29, 1976, abandoned.

[51] Int. Cl.² .................. F04B 17/00; F04B 35/00
[52] U.S. Cl. .................................. 417/363; 417/369; 237/63; 310/54
[58] Field of Search .............. 417/363, 424, 371, 370, 417/369, 366; 415/211; 237/12, 8 R, 63; 310/87, 40 MM, 54, 61; 363/34; 318/231, 230

[56] References Cited

U.S. PATENT DOCUMENTS

| | | | |
|---|---|---|---|
| 2,030,367 | 2/1936 | Grave | 417/363 |
| 2,245,989 | 6/1941 | Leathers | 417/363 |
| 2,438,621 | 3/1948 | Schoedel | 310/40 MM |
| 2,592,471 | 4/1952 | Sawyer | 417/423 |
| 3,103,605 | 9/1963 | Russell | 310/54 |
| 3,183,384 | 5/1965 | Flaherty et al. | 310/54 |
| 3,320,447 | 5/1967 | Banchieri | 310/54 |
| 3,398,687 | 8/1968 | Yoshikawa | 417/424 |
| 3,399,624 | 9/1968 | Echard et al. | 417/371 |
| 3,461,310 | 8/1969 | Pintell | 363/34 |
| 3,611,434 | 10/1971 | Jones | 318/231 |
| 3,860,858 | 1/1975 | Nola | 318/230 |
| 3,912,993 | 10/1975 | Bereisa | 318/230 |

FOREIGN PATENT DOCUMENTS 1276451  8/1968  Fed. Rep. of Germany .......... 417/424

*Primary Examiner*—Richard E. Gluck
*Attorney, Agent, or Firm*—Wood, Herron & Evans

[57] ABSTRACT

A pump for a central heating system having a tubular housing and a motor for driving an axial flow impeller which is mounted within the housing, the motor having casing mounted within the tubular housing, forming a liquid flow passage between the outer surface of the casing and the inner surface of the housing, the motor being adapted to be powered by electricity supply of a frequency greater than 70 Hertz, wherein the impeller is mounted upstream of the motor, and guide vanes are mounted in the annular passage to smooth the flow of liquid from the impeller.

8 Claims, 5 Drawing Figures

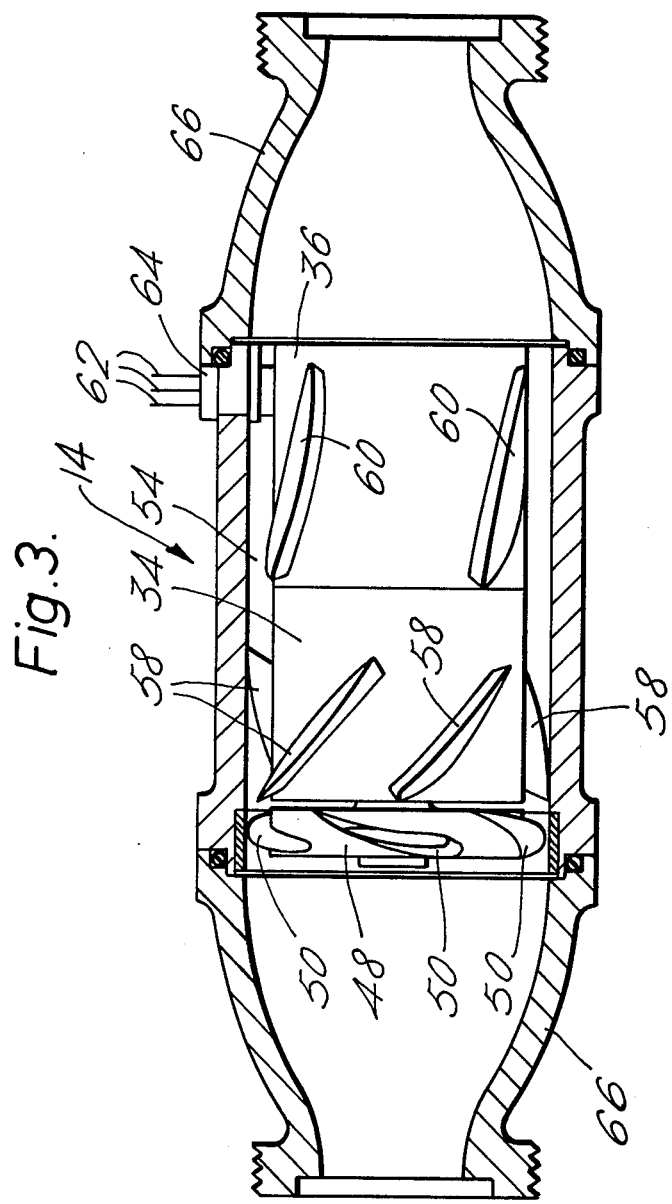

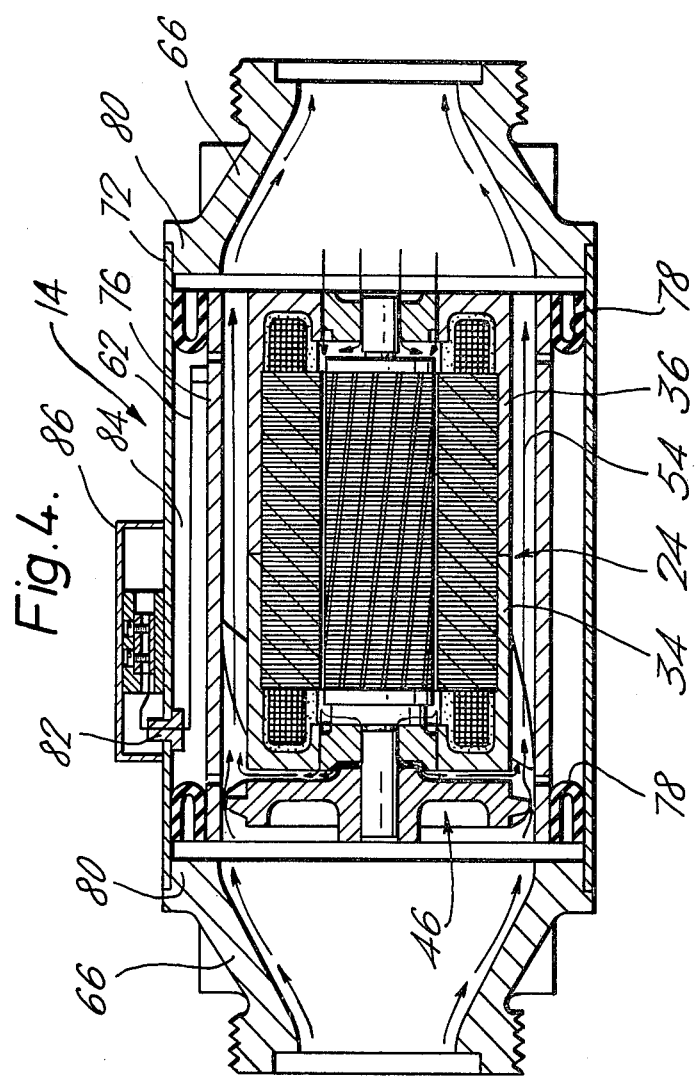

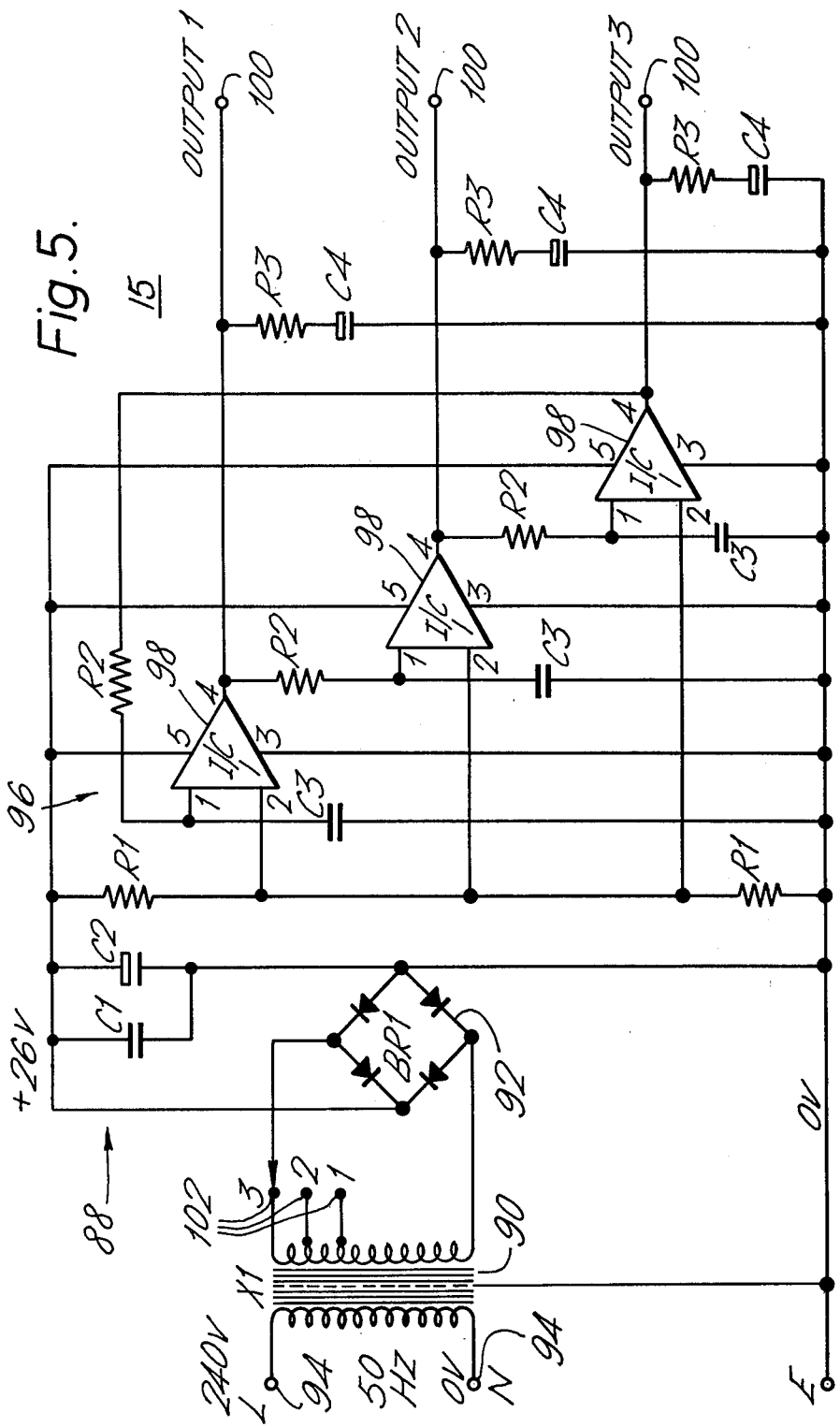

PUMP FOR CENTRAL HEATING SYSTEM

This is a continuation of application Ser. No. 681,451, filed Apr. 29, 1976, now abandoned.

This invention relates to axial flow pumps for pumping liquids and particularly relates to such pumps for use as circulating pumps for small bore central heating systems. Such systems generally have a closed circuit through which liquid which has been heated in a boiler is circulated by the pump which is located in the circuit.

Circulating pumps with the required head and flow-rate characteristics for central heating systems are usually driven by fractional horse-power electric motors and conventionally are of the centrifugal radial flow type. In one such pump, for example, a centrifugal radial flow pump impeller carries the rotor of a disc type induction motor and the stator of the motor is sealed from the liquid flow by a diaphragm seal. One of the required characteristics of a central heating pump is that it be small and compact and for this reason axial flow pumps have not been used for this purpose because a conventional fractional horsepower motor mounted axially behind the pump impeller in such a way that it did not impede the liquid flow from the impeller would necessitate a pumping chamber of comparatively large diameter. This problem can be overcome by mounting the motor outside the main pumping chamber but such a solution adds to the complexity of the pump.

It has been found, and this forms the basis of the invention, that by using low-voltage multiphase supply with a frequency greater than 70 Hertz for the electric motor it is possible to produce a simple and relatively inexpensive pump suitable for use as a circulating pump for small bore central heating systems in which the electric motor is mounted axially behind the pump impeller in the pumping chamber.

According to the invention a central heating system has a circulating pump including an axial flow impeller which is driven by a motor which is also located in the circuit the motor being adapted to be powered by an electricity supply of a frequency greater than 70 Hertz.

By "low voltage" is meant a voltage which is preferably no more than 25 volts, such a voltage being suitable for a completely immersed motor stator, i.e. a motor in which the pumped liquid completely fills the interior thereof. "Multi-phase" means at least two, and preferably three, phases. As previously indicated the electric motor should be run off an electricity supply with a frequency greater than 70 Hertz and preferably the frequency of the supply will be in the range of 75 to 400 Hertz, and is desirably 140 to 150 Hertz.

As no mains voltage is present at the motor, the risk of dangerous short circuits is eliminated. The use of a high frequency supply enables a sufficiently powerful motor to be made small enough to fit into a housing which need not necessarily be larger than the pipework to which it is connected. Also, the small size of the motor enables it to be started more easily.

The pump housing may be a simple tubular member or alternatively there may be a tubular outer member and a tubular sleeve resiliently mounted co-axially within the outer member. The resilient mounting of the tubular sleeve, for example by a sleeve or sleeves of resilient material interposed between the tubular sleeve and the outer member, isolates the motor and impeller assembly from the outer member and thereby reduces the transmission of vibrations from the assembly to the outer member and to the pipework secured thereto.

The motor will preferably be disposed downstream of the impeller. Guide vanes may be provided in an annular flow passage between the outer surface of the motor casing and the internal surface of the pump housing. The guide vanes may be adapted to hold the motor within the pump housing, and are preferably formed on the external surface of the motor casing and abut the internal surface of the pump housing. The guide vanes are so inclined that they act to straighten the liquid flow from the impeller, that is they eliminate or reduce swirl. It is preferred that the guide vanes be disposed in two axially spaced stages.

The electrical supply to the motor may be provided by an electric circuit which comprises a transformer and rectification circuit which converts the mains input, for example 250 volt 50 Hertz domestic supply, to low voltage, direct current and an oscillator circuit which converts the low voltage direct current to low voltage, multiphase, alternating current supply with a frequency greater than 70 Hertz for the electric motor, for example 10 volt, three phase and 140 Hertz. The oscillator circuit is preferably provided with an overload cut-out circuit which may be responsive to load dependent temperature rises in critical components of the power circuit such as the secondary winding of the transformer.

Variation in the supply to the electric motor may be achieved by varying the voltage, (suitable tappings being provided in the secondary winding of the transformer for this purpose) and/or by variation in the frequency as determined by the oscillator. A switch may be provided on the power supply to alter the supply to the motor so that the performance of the pump may be changed in accordance with individual requirements of central heating systems.

Preferred embodiments of the invention will now be described by way of example, with reference to the accompanying drawings in which:

FIG. 3 is a partial cross-section through the pump shown in FIG. 2 in which the impeller and motor assembly are not shown in section.

FIG. 4 is a cross-section through another embodiment of a pump for the central heating system of FIG. 1.

FIG. 5 is a schematic illustration of a power supply circuit for a pump according to the invention.

Figure 1:
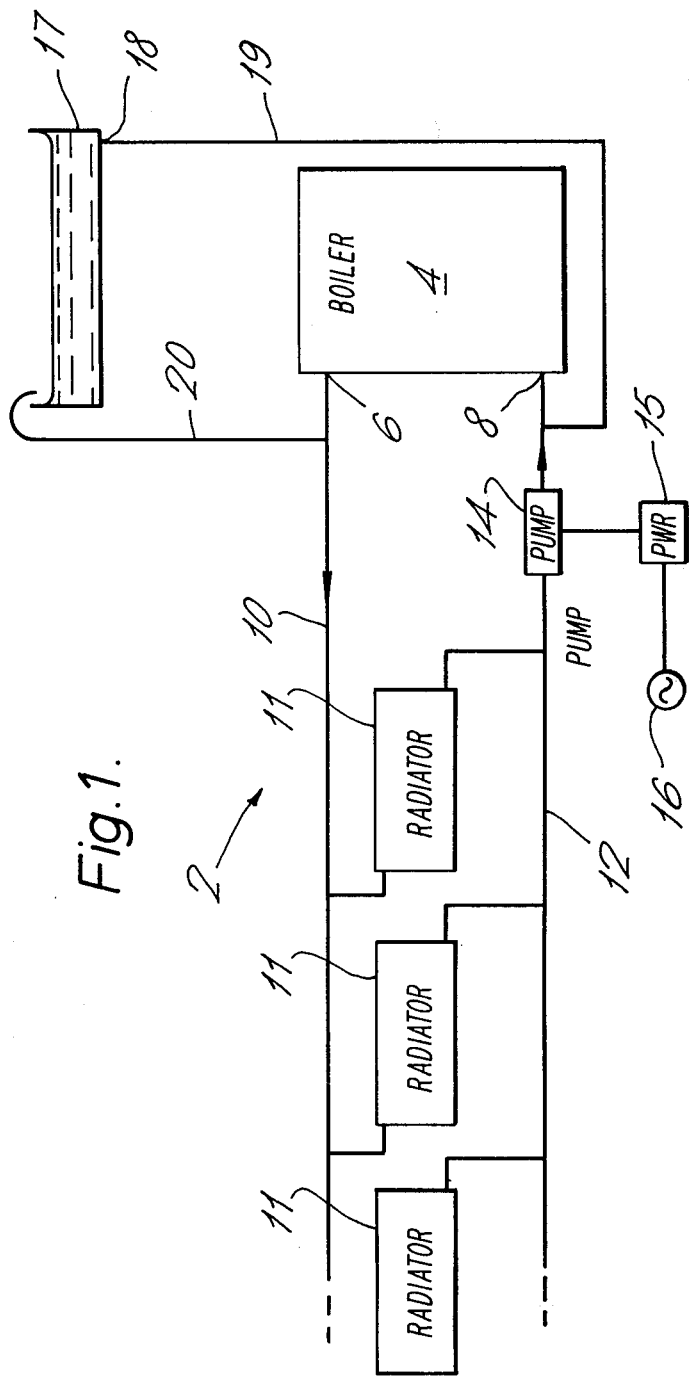
FIG. 1 is a schematic diagram of a central heating system in accordance with the invention.

Referring to FIG. 1, a two-pipe central heating system 2 includes a boiler 4, in which water is heated. The boiler 4 has an outlet 6 and an inlet 8. A flow pipe 10 leads from the outlet 6 to a number of radiators 11, and a return pipe 12 leads from the radiators 11 to the inlet 8. Heated water is circulated around the pipes 10 and 12 and through the radiators 11 by a circulating pump 14. Heat is transferred to the environment from the hot water by means of the radiators 11. The pump 14 is connected to a power supply 15, which is in turn connected to the domestic power supply 16. An expansion tank 17 is provided, and this has an outlet 18 from which a pipe 19 leads to the return pipe 12 adjacent inlet 8 of the boiler, so that the water in the central heating system 2 may be replenished by cold water from the tank 17 in the event of loss of water due to evaporation or leaks. An expansion pipe 20 leads from the flow pipe 10 to a position above the tank 17. Except for the pump 14 and associated power supply 15, the central heating system 2 is of a conventional type, and further description is deemed unnecessary.

Figure 2:
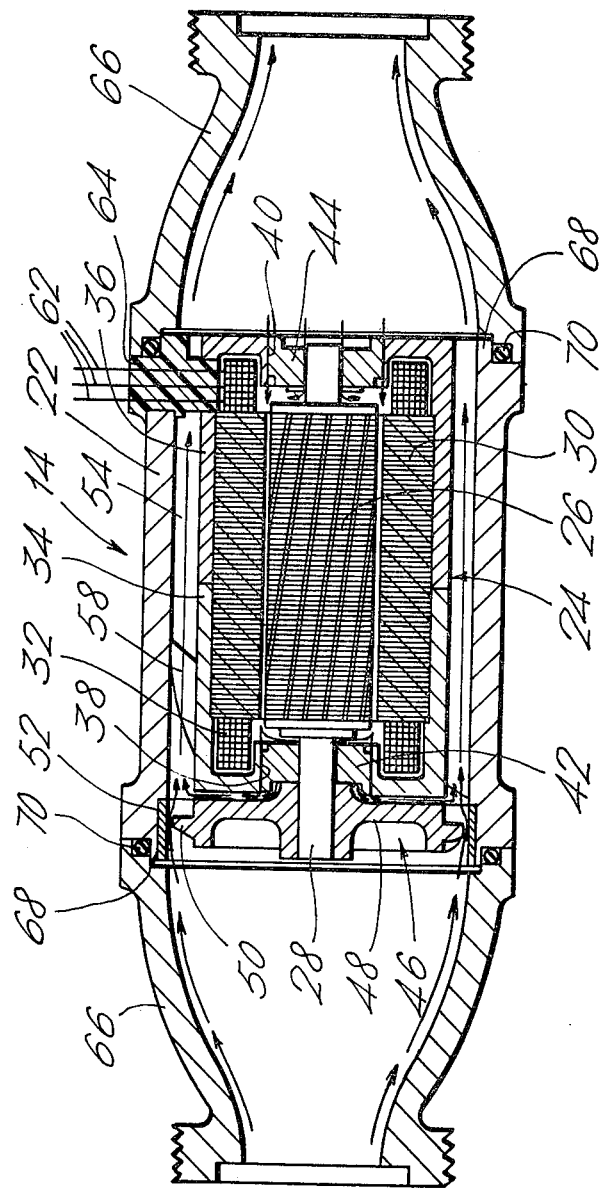
FIG. 2 is a cross-section through a pump for the central heating system of FIG. 1.

Referring to FIGS. 2 and 3, the pump 14 shown therein comprises a tubular housing 22 in which an electric induction motor 24 is coaxially mounted. The motor 24 comprises a squirrel cage rotor 26 mounted on an output shaft 28 and a laminated iron stator 30 which carries a field winding 32. The motor 24 has a casing which consists of two cup-shaped members 34 and 36 of plastics material which are sealed together at their abutting open ends by heat welding or by adhesive. After assembly of the laminated iron stator 30 and the field winding 32 in the casing, the remaining peripheral cavities are preferably filled with a curable filler such as epoxy resin to reduce the effect of small movement of the laminations or the windings. The end walls of the cup-shaped members 34 and 36 have axial apertures 38 and 40 respectively therein, in which impregnated carbon bearings 42 and 44 are located, which bearings rotatably mount the shaft 28 in the casing. In the absence of seals, pumped liquid will completely impregnate the interior of the motor 24.

An axial flow impeller 46 is mounted on the end of the shaft 28. The impeller 46 has a hub 48, which is substantially the same diameter as the outside diameter of the casing of the motor 24, on which are formed a multiplicity of hydrofoil-shaped blades 50, which blades 50 will typically have an angle of 9° 5' at the tip and 10° 38' at the root, each angle being measured between a plane normal to the axis of the impeller 46 and the datum chord of the hydrofoil section. (It should be understood that impeller blades of the aforesaid configuration are not essential for the employment of the invention and other suitable configurations may be used). A plastics liner 52 is located in a recess in the internal wall of the tubular housing 22 around the periphery of the impeller 46 and the function of this liner 52 is to provide a non-corrosive surface adjacent to the impeller blades 50.

The electric motor 24 is disposed downstream of the impeller 46 and forms an annular passage 54 between the external surface of the casing of the motor and the internal surface of the housing 22 through which the liquid flows from the impeller 46. The outer surface of the casing of the motor is provided with radially extending guide vanes and a first stage of hydrofoil guide vanes 58 is formed on the cup-shaped casing member 34 and a second stage of hydrofoil guide vanes 60 is formed on the cup-shaped casing member 36 (as shown most clearly in FIG. 3). The two guide vane stages will normally be of different configuration and I prefer to use a first stage of five guide vanes which are angled at 47° 25' at the tip and 45° 41' at the root (said angles being measured between a plane normal to the axis of the motor 24 and the datum chord of the hydrofoil section) and a second stage of four guide vanes angled at 80° at the tip and 76° 48' at the root. The guide vanes 58 and 60 serve first to eliminate the swirl of liquid flowing through the annular passage 54 and secondly, by abutting the internal surface of the housing, to support the motor 24 co-axially within the housing 22. The guide vanes 58 and 60 may be an interference fit in the housing 22 and thereby serve to prevent axial movement of electric motor within the housing 22 or alternatively may be a loose fit, other means being provided to axially secure the motor.

The electric supply wires 62 for the electric motor 24 are housed in a member 64 which fits in, and is sealed to, aligned slots in the housing 22 and the casing member 36 and which bridges the annular passage 54. The bridging member 64 will usually be formed from a synthetic plastics material and conveniently is formed from a heat shrinkable material which facilitates the securement of the supply wires 62 therein.

The housing 22 has end connections 66 secured thereto whereby the pump may be connected to the pipework of a liquid circuit. The end connections locate on spigots 68 at the ends of the housing 22 and accommodate 'O'-ring seals 70 which maintain a liquid-tight seal between the end connections 66 and the housing 22.

The second embodiment of the invention shown in FIG. 4 is very similar to the first embodiment and like parts are given like reference numerals. This embodiment differs chiefly in that the simple tubular housing 22 of the first embodiment is in the form of an inner sleeve 76 located within an outer tubular member 72. Resilient sleeves 78 are interposed between the outer member 72 and the inner sleeve 76. Each resilient sleeve 78 is in the form of an annular member having a U-shaped cross-section, and is made of resilient expanded material, for example an ethylene-propylene diene monomer rubber material of suitable hardness, and is bonded to the inner sleeve 76 and the outer member 72 by a suitable adhesive. The sleeves are arranged to reduce all modes of vibration of the inner sleeve 76 with respect to the outer member 72. It should be understood that, instead of the arrangement of sleeves 78 shown here, a single sleeve, or a different arrangement of a plurality of axially spaced sleeves may be used provided that the required flexibility is obtained in all modes of movement. An electric motor 24 and an impeller 46 are mounted coaxially within the inner sleeve 76 by guide vanes formed on the external surface of the motor casing in an exactly similar manner to the mounting of the motor and impeller assembly in the tubular housing 22 of the first embodiment.

The resilient sleeves 78 serve to isolate the motor 24 from the outer member 72 and thus prevent or reduce the transmission of vibration from the motor and impeller assembly to the outer member 72 and to the pipework connected to the end connections 66 secured to the outer member 72. Unlike the first embodiment of the invention the housing 22 locates on spigots 80 on the end connections 66 and is secured thereto by an adhesive which obviates the need for 'O'-ring seals.

The electric supply wires 62 pass through a watertight grommont 82 in the outer member 72 and span unsupported the annular passage 84 between the inner sleeve 76 and the outer member 72. The grommet 82 is axially spaced from the point at which the wires 62 span the annular passage 84 to leave a relatively long length of wire therebetween which reduces the transmission of vibrations by the wires to the outer member 72. Whilst the wires 62 are shown unsupported in spanning the annular passage 84 they could be supported by a bridging member as in the first embodiment of the invention. The wires 62 lead to a terminal box 86 located on the outer surface of outer member 72. A supply cable (not shown) leading from the power supply (see FIG. 5) is adapted for connection to terminal box 86.

The electric motor is identical to the electric motor shown in FIG. 2.

Many component parts of the pump according to the invention may be made from synthetic plastics material provided that the material used has a high stability and high strength at the working temperature of the pump, which, in the case of a central heating pump, will be about 80° C. Purely by way of example, the pump impeller 46 may be made from polyphenylene oxide with a 30% glass filling and the motor casing and the housing 22 of the second embodiment may be made from polyphenylene oxide with a 20% glass filling.

The power supply for the pump, illustrated schematically in FIG. 5, comprises a circuit 88 which includes a transformer 90, a rectifier 92, and a smoothing capacitor C2, to transform the alternating current at the input 94 into low voltage direct current. The low voltage direct current is fed to an oscillator 96 comprising three high main integrated circuit power amplifiers 98 connected as a ring oscillator. A three phase output is provided at terminals 100, the output being at a frequency of 140 Hertz, and in the form of square waves to reduce power dissipation. The input of the rectifier 92 may be selectively connected to one of three tappings 102 of the transformer 90 so that the output voltage of the oscillator 96 and hence the performance of the pump may be varied.

In the event of an overload occurring at the output due to a short circuit or a jammed pump motor, protection is taken care of in the internal circuitry of the integrated circuits 98.

The power supply is preferably mounted away from the pump so that it is not affected by the heat from the water in the central heating system. The risk of dangerous short circuits at the motor due to water reaching the stator windings or wires 62 is eliminated as only low voltages are present at the motor.

A pump according to the present invention can be made to be of compact size and, purely by way of example, a typical pump for use as a circulating pump of a domestic central heating system can be made with dimensions as follows:

Outside diameter of electric motor: 1.68 inches.
Outside diameter of impeller: 2.00 inches.

I claim:

1. In a central heating system including a boiler for heating liquid, heat transfer means for transferring heat from said liquid to the environment, and circulation means including pipe and a pump for circulating liquid through said pipe between said boiler and said heat transfer means, the improvement in said circulation means comprising:
    a pump including:
        (a) a housing adapted to be connected in series with said pipe,
        (b) an induction motor having unencapsulated motor windings and coaxially mounted within said housing, said induction motor having a casing which is unsealed to ensure that liquid enters said casing, said liquid contacting the motor windings for cooling said induction motor, said induction motor for rotating an impeller within said housing to cause said liquid to flow an annular passage between said housing and said casing, and
        (c) a motor power supply associated with said induction motor for converting an available alternating current voltage having a given frequency into a modified multiphase alternating current voltage having a higher frequency to energize said induction motor so as to produce a given flow requirement of said central heating system, said modified voltage having an amplitude not exceeding 25 volts and having a frequency greater than 70 Hertz,
    whereby said induction motor cannot be energized directly by said available voltage at said given frequency to produce said required flow and must be energized by said modified voltage at said higher frequency to produce said required flow.

2. The central heating system of claim 1 wherein said impeller is rotatably mounted upstream from said induction motor and wherein said pump further includes guide vanes in said annular passage for rendering said flow axial with said housing.

3. A pump for a central heating system comprising:
    a housing having oppositely disposed ends;
    an induction motor coaxially mounted within said housing, said induction motor having unencapsulated motor windings and having a casing which is unsealed to ensure that liquid enters said casing, said liquid contacting the motor windings for cooling said induction motor, said induction motor for rotating an impeller within said housing to cause said liquid to flow through an annular passage between said housing and said casing, said impeller being rotatably mounted upstream from said induction motor;
    guide vanes mounted in said annular passage for axially orienting said flow of said liquid; and
    a motor power supply associated with said induction motor for converting an available alternating current voltage having a given frequency into a modified multiphase alternating current voltage having a higher frequency to drive said induction motor so as to produce a given flow requirement of said central heating system, said modified voltage having an amplitude not exceeding 25 volts and having a frequency greater than 70 Hertz;
    whereby said induction motor is energized by said modified voltage at said higher frequency and rotates said impeller such that said required flow is produced notwithstanding said annular passage has a small cross-sectional area and precludes production of said required flow by direct energization of said induction motor by said available voltage at said given frequency.

4. The pump of claim 3 wherein said guide vanes are adapted to coaxially mount said induction motor within said housing.

5. The pump of claim 3 wherein said guide vanes are disposed in two axially spaced stages.

6. The pump of claim 3 wherein said housing includes an outer tubular member and an inner tubular member, said inner tubular member being resiliently mounted to said outer tubular member.

7. The pump of claim 6 further including:
    a resilient sleeve interposed between said outer and inner tubular members for mounting said inner tubular member to said outer tubular member.

8. The pump of claim 3 further including:
    end connections attached to said oppositely disposed ends of said housing, said end connections being adapted for series connection with pipe in said central heating system.

* * * * *

UNITED STATES PATENT AND TRADEMARK OFFICE
CERTIFICATE OF CORRECTION

PATENT NO. : 4,213,745
DATED : July 22, 1980
INVENTOR(S) : Samuel Alfred Roberts It is certified that error appears in the above–identified patent and that said Letters Patent are hereby corrected as shown below:

Column 5, line 59, between "flow" and "an" insert
--through--.

Signed and Sealed this

Seventh Day of October 1980

[SEAL]

Attest:

SIDNEY A. DIAMOND

Attesting Officer  Commissioner of Patents and Trademarks